Aug. 18, 1931.  B. I. FINK  1,819,952
AUTOMATIC HAND BRAKE RELEASE
Filed Oct. 25, 1928   3 Sheets-Sheet 2
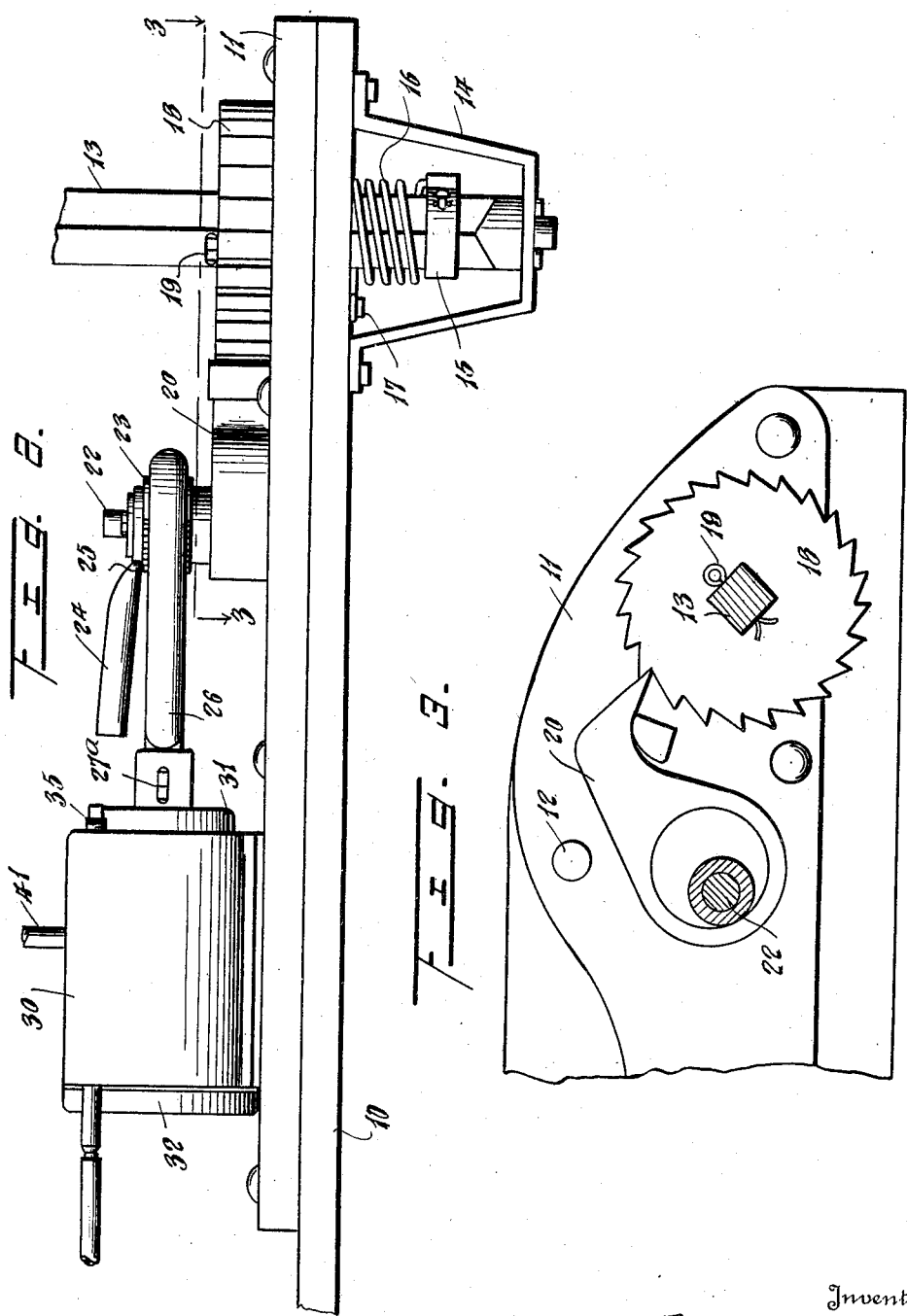
Inventor
B. I. Fink.
By
Attorney

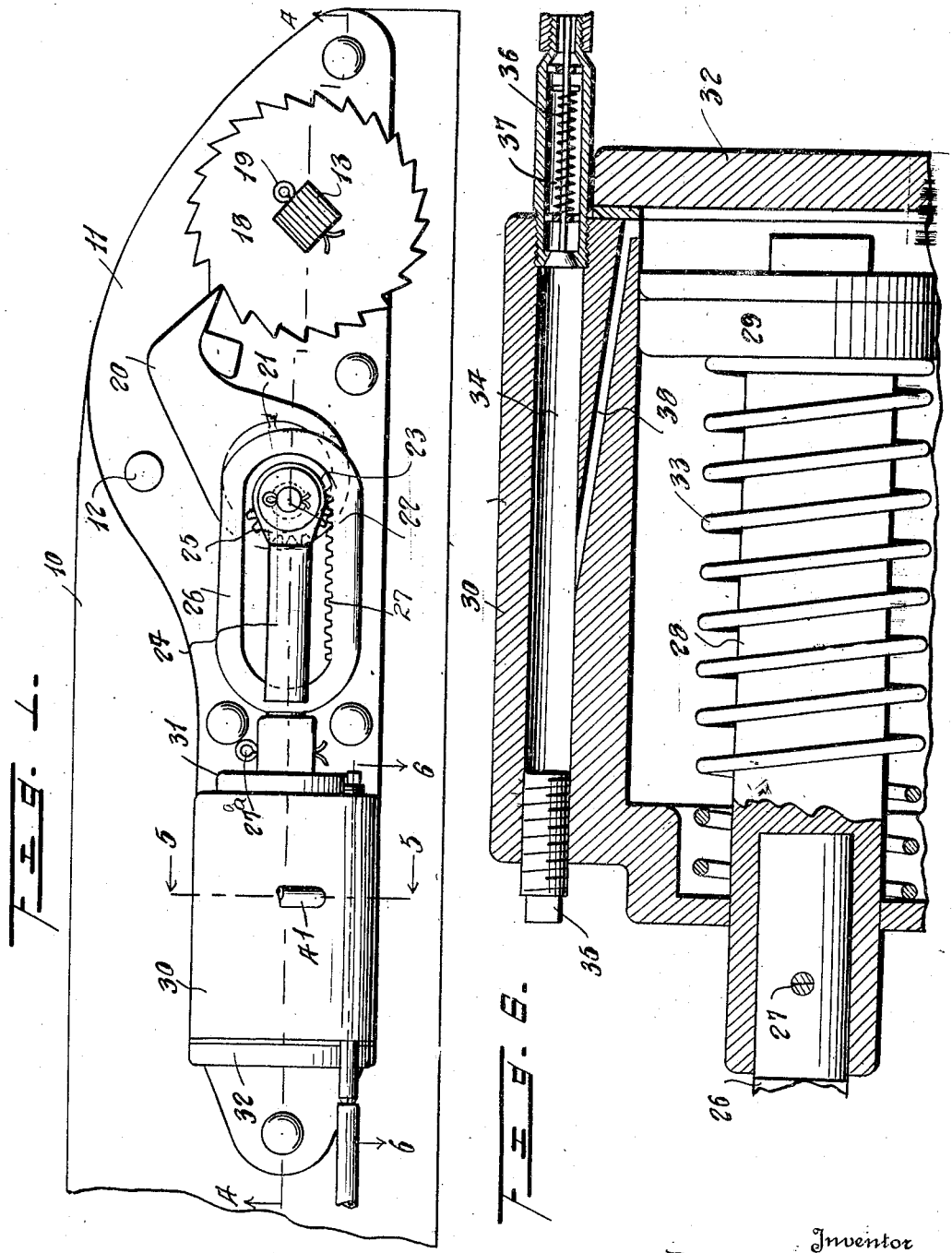

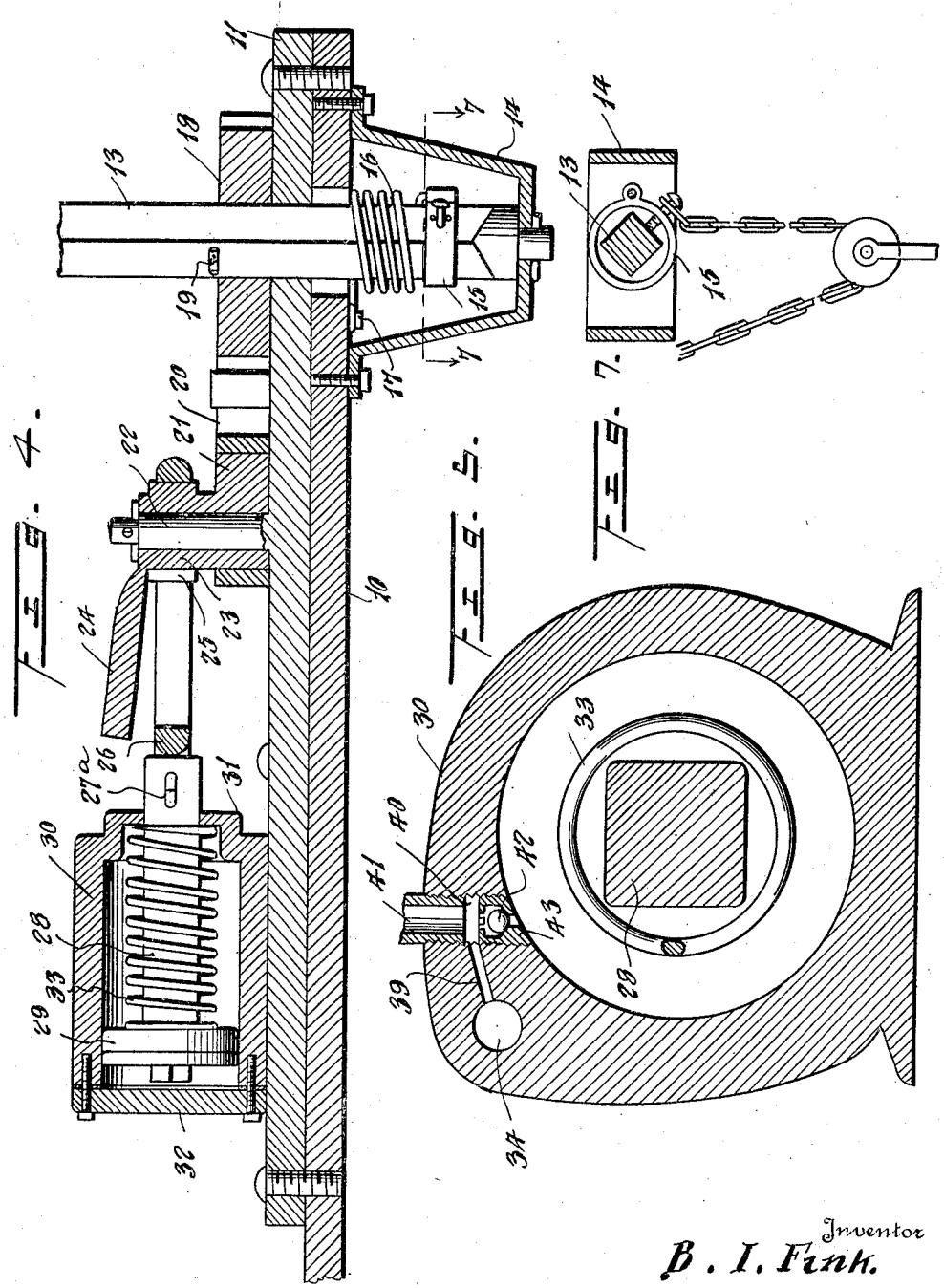

Patented Aug. 18, 1931

1,819,952

UNITED STATES PATENT OFFICE

BERL I. FINK, OF HINTON, WEST VIRGINIA, ASSIGNOR OF ONE-THIRD TO J. R. WHEELER AND ONE-THIRD TO C. E. FINK, BOTH OF HINTON, WEST VIRGINIA

AUTOMATIC HAND BRAKE RELEASE

Application filed October 25, 1928. Serial No. 315,016.

This invention relates to an automatic hand brake release primarily adapted for use in connection with the hand brakes of freight cars.

It is primarily aimed to provide a means or mechanism whereby such hand brakes on freight cars or the like will be automatically released when the engineer releases the air brakes of the associated freight cars. Such mechanism prevents delays, saves fuel and power and prevents damage to the car wheels from sliding. In addition it is safer than the old method because the brakes can be released by hand without climbing on top of the car or winding the shaft to free the pawl.

Various additional objects and advantages will become apparent, and in part be pointed out, in the description following taken in connection with accompanying drawings illustrating an operative embodiment.

In said drawings:—

Figure 1 is a plan view showing the device fastened to the brake step of the car, Figure 2 is a side elevation of the parts shown in Figure 1, Figure 3 is a sectional view taken on the line 3—3 of Figure 2, Figure 4 is a longitudinal sectional view taken on the line 4—4 of Figure 1, Figure 5 is a cross sectional view taken on the line 5—5 of Figure 1, Figure 6 is a cross sectional view taken on the line 6—6 of Figure 1, and Figure 7 is a cross sectional view taken on the line 7—7 of Figure 4.

Referring specifically to the drawings, 10 fragmentarily designates the brake step of a freight car to which a base plate 11 is adapted to be bolted or otherwise fastened as at 12, and which base plate supports the various parts or mechanism constituting the present invention.

A shaft 13 is provided to control the application and release of the hand brake of the car, which shaft is rotatable in the step 10 and plate 11, being journaled and supported from below by a bracket as at 14. Means to control the brake itself (not shown), is effected through the action of a collar 15 loosely mounted on the shaft 13 and to which one end of a torsion spring 16 is fastened, the other end of which as at 17 is fastened to the step. Such spring 16 is wound or tensioned as the brake is applied through turning of the shaft 13. When the brake is released, the tension or torsion of the spring 16 returns the shaft 13 to normal position.

Mounted on the shaft 13 so as to turn therewith is a ratchet wheel 18, held against displacement by a cotter or the like 19 engaging the shaft 13. Coacting with the teeth of ratchet wheel 18 is a detent pawl 20 which is pivotally mounted on an eccentric disk 21 journaled on a stub shaft 22 which may be integral with the plate 11.

Disk 21 has a tubular extension 23 with which an operating handle 24 is integral which constitutes a gear wheel as it has teeth at 25.

A link or loop 26 surrounds the gear wheel 25 and at one of its inner sides has a row of gear teeth 27 adapted for meshing with the teeth of gear wheel 25. It will be seen that the gear wheel 25 is mutilated inasmuch as its teeth extend but approximately halfway around the same.

Link 26 is rigidly but detachably connected as at 27ª to a rod 28 of a piston 29. Piston 29 may be of any appropriate construction and it is disposed within a cylinder 30 having an integral head 31 at one end constituting a guide for the rod 28 and having a detachable head 32 at the pressure end. An expansive coil spring 33 surrounds rod 28 and bears against the head 31 at one end and the piston 29 at the other end, whereby the piston is constantly urged to retracted position by said spring 33.

In order to supply compressed air between the piston 29 and head 32 to operate the former against the tension of the spring 33, an inlet passageway 34 is provided longitudinally in the wall of the cylinder 30, being closed at one end by a plug 35 and at its other end having a valved inlet nipple 36, the valve 37 being of any conventional spring controlled type which will permit the passage of compressed air past the same and then be automatically closed. An inclined passage 38 leads from passageway 34 to a location between the piston 29 and head 32. From the passageway 34, a small passageway 39 leads to an exhaust conduit 40 having a pipe 41 connected therein and which conduit 40 is normally closed as by a ball valve 42 seated in a cage 43 fastened in the passage 40.

In use, when the engineer releases the air brakes of the freight car or other car to which the invention is applied, he also operates the present invention so as to release the hand brakes. The releasing of the air brakes is done by means of the usual engineer's brake valve and the exhaust air from the brake cylinder flows from the exhaust port of the triple valve through the pipe 36. It is optional that the compressed air may be applied from any desired location and for instance from either the exhaust port of the triple valve or the exhaust port of the retainer valve forming standard equipment of freight car. The compressed air enters the passageway 34, passageway 38 and thence between the piston 29 and head 32, moving (presuming the brake controlled by shaft 13 to have been applied) the pawl 20 out of engagement with the rack teeth of wheel 18. Such action is effected since the sliding movement of piston 29 slides rod 28 and link 26, thus turning gear 25, shaft 22 and eccentric 21, the latter acting directly on the pawl 20 to retract it. As soon as the pawl 20 releases the ratchet wheel 18, the spring 16 restores shaft 13 to normal and unapplied position, releasing the brake. At the same time, the piston 29 near the end of its movement uncovers cage 43 so that the compressed air escapes past the valve 42 and passageway 40 and pipe 41 into the atmosphere, whereupon spring 33 which has been tensioned through the movement mentioned, will expand and restore the parts to normal position. The passage 39 allows the air to pass to the retainer valve when the pressure is reduced to the point where it is too low to hold the piston 29 out far enough to uncover the cage 43. Such small passage 39 also prevents the air brakes from sticking in case the automatic hand brake release mechanism is damaged by collision. The valve 42 prevents air which escapes into the passageway 39 from entering the cylinder in front of the piston and hence causes it to pass to the retainer valve. The construction of the device may vary to suit the requirements of different types of freight cars and may be used as standard equipment therefor and either built into the same initially or used as an attachment for existing cars.

With the use of the device, it is not necessary to delay the train while the brakemen go over it and release the hand brakes. The engineer simply applies the air brakes and releases them and the hand brakes are automatically released. The present invention provides a means which is safer, quicker, surer and cheaper and in which the cost of construction is small compared to the saving in fuel, power, time and repairs, The invention does not affect the operation of the air brakes in the least and it will not release itself or kick off.

Various changes may be resorted to provided they fall within the spirit and scope of the invention.

I claim as my invention:—

1. In combination with a hand brake mechanism, a detent pawl therefor, an eccentric on which the pawl is journaled, a shaft carrying said eccentric, a mutilated gear wheel movable with the eccentric, a rack member engaged by the gear wheel, a piston movable with the rack member, and a cylinder carrying said piston, an expansive coil spring in the cylinder engaging the piston to normally maintain it retracted, and means for the application of compressed air to the cylinder from the exhaust incidental to release of the air brakes.

2. In combination with a hand brake mechanism, a detent pawl therefor, an eccentric on which the pawl is journaled, a shaft carrying said eccentric, a mutilated gear wheel movable with the eccentric, a rack member engaged by the gear wheel, a piston movable with the rack member, and a cylinder carrying said piston, an expansive coil spring in the cylinder engaging the piston to normally maintain it retracted, means for the application of compressed air to the cylinder from the exhaust incidental to release of the air brakes including a passageway, a passageway for the exhaust of compressed air from the cylinder normally closed by an automatically displaceable valve, and a relatively small passageway extending from the first mentioned to the second mentioned air passageway.

3. In combination with a hand brake mechanism, a detent pawl therefor, an eccentric on which the pawl is journaled, a shaft carrying said eccentric, a mutilated gear wheel movable with the eccentric, a rack member engaged by the gear wheel, and means to operate the rack member from the exhaust incidental to release of the air brakes.

In testimony whereof I affix my signature.

BERL I. FINK.